United States Patent
Kuppannan et al.

(10) Patent No.: US 11,303,678 B2
(45) Date of Patent: Apr. 12, 2022

(54) DETERMINATION AND AUTOCORRECTION OF MODIFIED SECURITY POLICIES

(71) Applicant: COLORTOKENS, INC., Santa Clara, CA (US)

(72) Inventors: Jayaraghavendran Kuppannan, Bengaluru (IN); Deepak Kushwaha, Bengaluru (IN); Binjith Payyappatt Satheendran, Bengaluru (IN); Ramprasath Rajagopalan, Bengaluru (IN)

(73) Assignee: COLORTOKENS, INC., Santa Clara, CA (US)

( * ) Notice: Subject to any disclaimer, the term of this patent is extended or adjusted under 35 U.S.C. 154(b) by 298 days.

(21) Appl. No.: 16/541,528

(22) Filed: Aug. 15, 2019

(65) Prior Publication Data
US 2021/0051178 A1 Feb. 18, 2021

(51) Int. Cl.
*H04L 29/06* (2006.01)
*H04L 47/2483* (2022.01)

(52) U.S. Cl.
CPC .......... *H04L 63/20* (2013.01); *H04L 47/2483* (2013.01); *H04L 63/0263* (2013.01); *H04L 63/108* (2013.01)

(58) Field of Classification Search
CPC ... H04L 63/0263; H04L 63/108; H04L 63/20; H04L 47/2483

(Continued)

(56) References Cited

U.S. PATENT DOCUMENTS 8,856,289 B2 * 10/2014 Ansari ............... G10L 15/22
709/220
9,548,994 B2 * 1/2017 Pearcy ............... G06F 21/577
(Continued)

OTHER PUBLICATIONS

Hamdi et al. 2007 IEEE International Conference on Emerging Security Information, Systems and Technologies "A Software Architecture for Automatic Security Policy Enforcement in Distributed Systems" pp. 187-192 (Year: 2007).*
(Continued)

*Primary Examiner* — Khalil Naghdali
(74) *Attorney, Agent, or Firm* — Barry Choobin; Patent 360LLC

(57) ABSTRACT

A method and a system for automatically managing security policies at multiple resources are provided. A policy management engine receives and deploys a security policy configured for each resource with one or more configuration parameters on a security component of each resource. The policy management engine determines modifications made to the security policy at a corresponding resource and automatically corrects the security policy at the corresponding resource. The policy management engine generates and renders a notification including the security policy, the modifications, and detailed information of the modifications and the automatic correction of the security policy to an administrator device. The detailed information includes a description, a type, a timestamp, number of instances, etc., of each modification, volume and type of traffic flow incurred due to the modifications, historical modification information, a timestamp and a status of the automatic correction, historical correction information, a resource identification, event information, etc.

18 Claims, 3 Drawing Sheets

(58) Field of Classification Search
USPC .............................................. 726/1
See application file for complete search history.

(56) References Cited

U.S. PATENT DOCUMENTS

2007/0143851 A1* 6/2007 Nicodemus ........... G06F 21/577
726/25
2007/0180490 A1* 8/2007 Renzi .................... H04L 63/145
726/1
2007/0294312 A1* 12/2007 Seshadri ................ H04L 63/20

OTHER PUBLICATIONS

Cheaito et al., 2010 IEEE, "A deployment framework for self-contained policies", Communications Society by subject matter experts for publication in the CNSM 2010 proceedings, pp. 88-95 (Year: 2010).*

* cited by examiner

DETERMINATION AND AUTOCORRECTION OF MODIFIED SECURITY POLICIES

BACKGROUND

Technical Field

The embodiments disclosed herein, in general, relate to management of security policies. More particularly, the embodiments disclosed herein relate to detecting, automatically correcting, and notifying modifications made to security policies at multiple resources.

Description of the Related Art

In conventional perimeter firewalls, firewall systems are standalone units that strictly control access to an internal private network and network resources, thereby making it difficult for users to modify security policies, for example, firewall policies. Moreover, the list of software applications installed on these firewall systems is firmly controlled, making it difficult for malware to be installed on these firewall systems. Adoption of microsegmentation using host-based or distributed firewalls is on the rise. Most enterprises are moving towards microsegmented networks. Microsegmentation is used to segment and control access between resources and servers in a granular way. However, with microsegmentation and, host-based or distributed firewalls, security policies, for example, host-based firewall policies, are directly configured on the resources or endpoint devices, for example, servers, workstations, user machines, laptops, tablet computing devices, etc., on which user access cannot be restricted. Furthermore, on these resources, it is difficult to restrict the type of software being installed. There is a high possibility that either an insider threat from a malicious user or a malicious software may modify the security policies to gain access to the internal private network and network resources, when such an access has been prevented explicitly. Since these resources are accessed by many employees of an organization and many applications are installed on these resources, there is a risk of an employee or software with malicious intent modifying the security policies, as the security policies are directly configured on the resources. There is a need for detecting such modifications and automatically correcting the security policies. Moreover, there is a need for notifying these modifications to system administrators to allow them to investigate the resources involved in security breaches and identify reasons behind the security breaches. Conventional solutions do not support detecting, identifying, correcting, and notifying modifications made to security policies at endpoints.

Hence, there is a long-felt need for a method and a system for automatically managing security policies at multiple resources by detecting, identifying, automatically correcting, and notifying modifications made to the security policies at the resources.

SUMMARY

This summary is provided to introduce a selection, of concepts in a simplified form that are further disclosed in the detailed description. This summary is not intended to determine the scope of the claimed subject matter.

The method and the system disclosed herein address the above-recited need for automatically managing security policies at multiple resources, or endpoint devices by detecting, identifying, automatically correcting, and notifying modifications made to the security policies at the resources. The method and the system disclosed herein allow system administrators to be notified of unauthorized modifications made to security policies and for such modifications to be automatically corrected at the resources. The method disclosed herein employs a policy management engine and at least one processor configured to execute computer program instructions defined by the policy management engine for detecting, identifying, automatically correcting, and notifying modifications made to the security policies at multiple resources. In an embodiment, the resources comprise grouped sets of resources.

The policy management engine receives and deploys a security policy configured for each of the resources with one or more of multiple configuration parameters on a security component of each of the resources. The security component is, for example, a host-based firewall deployed on each of the resources. The security policy is, for example, a host-based firewall policy implemented at each of the resources. The configuration parameters comprise, for example, a type of each rule of the security policy, a source internet protocol (IP) address, a destination IP address, a destination port, a traffic protocol, etc. In an embodiment, the policy management engine transforms the security policy into a format applicable to each of the resources and configures the transformed security policy on the security component of each of the resources. The policy management engine creates and stores a policy digest comprising the security policy and the configuration parameters in a storage device at each of the resources. The policy management engine monitors the security component and determines modifications made to the security policy at a corresponding resource. The modifications comprise, for example, additions, deletions, and changes made to the security policy. The changes made to the security policy comprise, for example, allowing or denying access to one or more resources for one or more protocols. In an embodiment, the policy management engine recomputes the security policy at the security component of the corresponding resource and compares the recomputed security policy with the deployed security policy for determining the modifications made to the security policy at the corresponding resource.

On determining the modifications made to the security policy, the policy management engine automatically corrects the security policy at the corresponding resource. The policy management engine generates and renders a notification comprising the security policy, the modifications, and detailed information of the modifications and the automatic correction of the security policy to at least one administrator device for analysis and management of the security policy. The detailed information of the modifications and the automatic correction of the security policy comprises, for example, an identification of the corresponding resource, a description of the modifications made to the security policy at the corresponding resource, a type of each of the modifications, a timestamp of each of the modifications, locations of the modifications, a number of instances of each of the modifications, volume and type of traffic flow incurred due to the modifications, historical modification information associated with each of the resources, corrections required in the security policy, a timestamp of the automatic correction, a status of the automatic correction, historical correction information associated with each of the resources, and event information that triggered the modifications. The historical modification information provides an indication of a corresponding resource where the security policy is continuously modified. In an embodiment, the policy management engine determines an extent and patterns of changes incurred due to the modifications made to the security policy at each of the resources using one or more items of the detailed information.

In an embodiment, the policy management engine is implemented at a policy controller on an administrator device and at a policy agent deployed on each of multiple resources in a one-to-one correspondence, where one policy agent corresponds to one resource. The policy controller supports the configuration of security policies between grouped sets of resources. The policy controller supports derivation of resource specific security policies and sending the resource specific security policies to the resources. The policy controller supports receiving the modified security policies from the resources and by comparing the modified security policies with the original security policies, determines, for example, port and protocol based rules added and/or deleted, IP addresses added to existing port and protocol based rules, IP addresses deleted in existing port and protocol based rules, etc. The policy controller also determines the traffic which was allowed or denied due to the modifications made to the security policies. Furthermore, the policy controller notifies a system administrator of, for example, the exact nature of modifications made to the security policies, a time of each modification, a time of each correction, history of such modifications including a count of such modifications and details of such modifications, traffic that was allowed due to the modifications made to the security policies, etc. The policy agent deployed at each of the resources receives the set of security policies from the policy controller and converts, the security policies to a format that can be interpreted by operating system (OS) application programming interfaces (APIs) or commands. The policy agent creates and maintains a digest of rules from the received security policy. The policy agent monitors the security component deployed at the resource for any modifications made to the security policy deployed at the security component and, on identifying such modifications, the policy agent generates and renders a notification comprising, for example, a complete set of rules including the modified rules of the security policy, time of modification, time of autocorrection, etc.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description, is better understood when read in conjunction with the appended drawings. For illustrating the method and the system disclosed herein, exemplary constructions of the method and the system disclosed herein are shown in the drawings. However the method and the system disclosed herein are not limited to the specific methods and components disclosed herein. The description of a method step or a component referenced by a numeral in a drawing is applicable to the description of that method step or component shown by that same numeral in any subsequent drawing herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
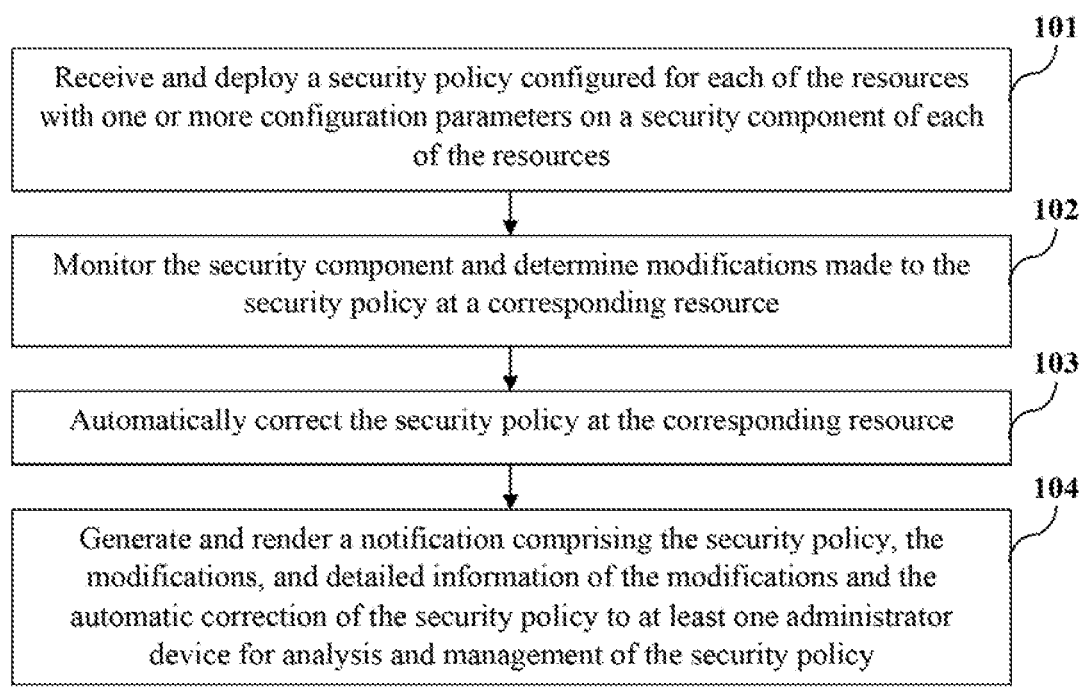
FIG. 1 illustrates a method for automatically managing security policies at multiple resources.

FIG. 1 illustrates a method for automatically managing security policies at multiple resources. The method disclosed herein employs a policy management engine and at least one processor configured to execute computer program instructions defined by the policy management engine for detecting, identifying, automatically correcting, and notifying modifications made to security policies at multiple resources. The resources are devices on which security policies are configured by creating and applying rules of the security policies on security components deployed on the resources. The rules of the security policies, for example, allow only specific and restricted access from resources such as endpoint devices to only allowed resources such as servers. The resources comprise, for example, endpoint devices such as personal computers, tablet computing devices, mobile computers, mobile phones, smart phones, portable computing devices, laptops, personal digital assistants, wearable computing devices such as smart glasses, smart watches, etc., touch centric devices, workstations, client devices, servers, portable electronic devices, network-enabled computing devices, interactive network-enabled communication devices, gaming devices, image capture devices, web browsers, any other suitable computing equipment, combinations of multiple pieces of computing equipment, etc. In an embodiment, the resources comprise grouped sets of resources, where each grouped set of resources is provided specific and restricted access to only allowed resources.

The security policies comprise, for example, host-based firewall policies configured on security components, for example, host-based firewalls deployed at the resources. A host-based firewall is a firewall that runs on each individual resource connected to a network. The host-based firewall determines whether to allow incoming and outgoing network traffic into and out of an individual resource, protects the individual resource from viruses and malware, and controls the spread of malware attacks throughout the network. The host-based firewall blocks inbound and outbound network traffic that is not expressly permitted by a host-based firewall policy. The security policies comprise rules that define how inbound and outbound network traffic should be handled for specific Internet protocol (IP) addresses, address ranges, protocols, applications, etc. The rules of the security policies are typically configured based on a source IP address, a destination IP address, and a port and protocol combination. The rules of the security policies define what IP protocols to pass, appropriate source and destination IP addresses to be used, transmission control protocol (TCP) and user datagram protocol (UDP) ports to be accessed, particular internet control message protocol (ICMP) types and codes to be used, etc. For example, rules of the host-based firewall policy typically use an IP address, a port, a protocol, and a direction of traffic, that is, inbound or outbound, as filters to determine whether to allow traffic to either enter or exit a resource on which the host-based firewall policy is applied.

In the method disclosed herein, the policy management engine receives and deploys 101 a security policy configured for each of the resources with one or more of multiple configuration parameters on a security component, for example, a host-based firewall, of each of the resources. The security policy is, for example, a host-based firewall policy implemented at each of the resources. The configuration parameters comprise, for example, a type of each rule of the security policy, a source IP address, a destination IP address, a destination port, a traffic protocol, etc. In an embodiment, the policy management engine transforms the security policy into a format applicable to each of the resources, and configures the transformed security policy on the security component of each of the resources. The policy management engine creates and stores a policy digest comprising the security policy and the configuration parameters in a storage device at each of the resources. The policy management engine monitors 102 the security component and determines modifications made to the security policy at a corresponding resource. The modifications comprise, for example, additions, deletions, and changes made to the security policy that tamper the originally configured security policy. The additions comprise, for example, addition of one or more rules to the security policy. The deletions comprise, for example, deletion of one or more rules from the security policy. The changes comprise, for example, allowing access to particular IP addresses that were not part of the originally configured security policy, denying access to specific IP addresses that were part of the originally configured security policy, adding a port and a protocol that were not part of the originally configured security policy, etc. The policy management engine identifies when the security policy was tampered, that is, when an unauthorized modification was made to the security policy within a particular resource.

In an embodiment, the policy management engine recomputes the security policy at the security component of the corresponding resource and compares the recomputed security policy with the deployed security policy for determining the modifications made to the security policy at the corresponding resource. On determining the modifications made to the security policy, the policy management engine automatically corrects 103 the security policy at the corresponding resource. The policy management engine reapplies the correct security policy as originally configured for the corresponding resource where the modifications were determined, thereby automatically correcting the modified security policy at the corresponding resource. The policy management engine generates and renders 104 a notification comprising the security policy, the modifications, and detailed information of the modifications and the automatic correction (autocorrection) of the security policy to at least one administrator device for analysis and management of the security policy.

The detailed information of the modifications and the autocorrection of the security policy comprises, for example, an identification of the corresponding resource where the modifications were determined, a description of the modifications made to the security policy at the corresponding resource, a type of each of the modifications, a timestamp of each of the modifications, locations of the modifications, a number of instances of each of the modifications, volume and type of traffic flow incurred due to the modifications, historical modification information associated with each of the resources, corrections required in the security policy, a timestamp of the autocorrection, a status of the autocorrection, historical correction information associated with each of the resources, and event information that triggered the modifications. The historical modification information provides an indication of a corresponding resource where the security policy is continuously modified. Using the detailed information in the notification, the policy management engine notifies, for example, the time of modification of rules in the security policy, the type of modification such as addition of one or more rules, deletion of one or more rules, changes made to one or more rules such as allowing or denying access to one or more resources for one or more protocols, etc., status of autocorrection of the security policy, that is, whether the autocorrection succeeded or not, number of modification instances with a timestamp of each modification, an extent of unauthorized traffic flow incurred due to the modification, etc., to a system administrator via a graphical user interface (GUI) of an administrator device. Using the detailed information in the notification, the system administrator can generate insights on the reasons for the modifications, for example, allowing access to a restricted server through a transmission control protocol (TCP) port 443 to steal information from that restricted server or allowing access to a restricted website such as an entertainment website on an work computer, etc. In an embodiment, the policy management engine determines an extent and patterns of changes incurred due to the modifications made to the security policy at each of the resources using one or more items of the detailed information, for example, the historical modification information, the historical correction information, etc. The history of modifications and corrections made to security policies at particular resources allows a system administrator to determine and investigate the resources involved in security breaches and identify reasons behind the security breaches. The extent and patterns of changes made to the security policy at a corresponding resource over time allow the system administrator to generate insights related to security breaches at the corresponding resource.

The policy management engine monitors and detects any unauthorized modifications made to the security policies deployed at the security components of the resources. The policy management engine also autocorrects and adds the correct security policy in case of any modifications made to the security policy at a resource. The policy management engine derives and displays exact modifications made to the security policy, for example, in terms of port and protocol rules added to and deleted from the security policy. For example, the policy management engine derives and displays exact modifications made to the security policy in terms of IP addresses added to and/or deleted from the rules of the security policy. The policy management engine also provides additional information, for example, an exact time of a modification made to each of the rules of the security policy and the exact time of correction. Furthermore, the policy management engine correlates and identifies the extent of damage caused by the modifications made to the security policy by correlating the traffic allowed during the duration for which the security policy implemented on the security component was modified.

Through the generated notification, the policy management engine notifies the system administrator about the security policy being tampered at the resources. The detailed information related to each modification, for example, the port and protocol and IP addresses allowed, in the notification helps the system administrator to identify the intent behind each modification and type of data that may have leaked front the network. The quick autocorrection performed by the policy management engine helps to prevent data leakage. The historical modification information and number of tampering attempts or instances of the modifications contained in the detailed information helps the system administrator to identify the resource that is continuously being attacked and to take actions, for example, quarantining the resource, etc.

Figure 2:
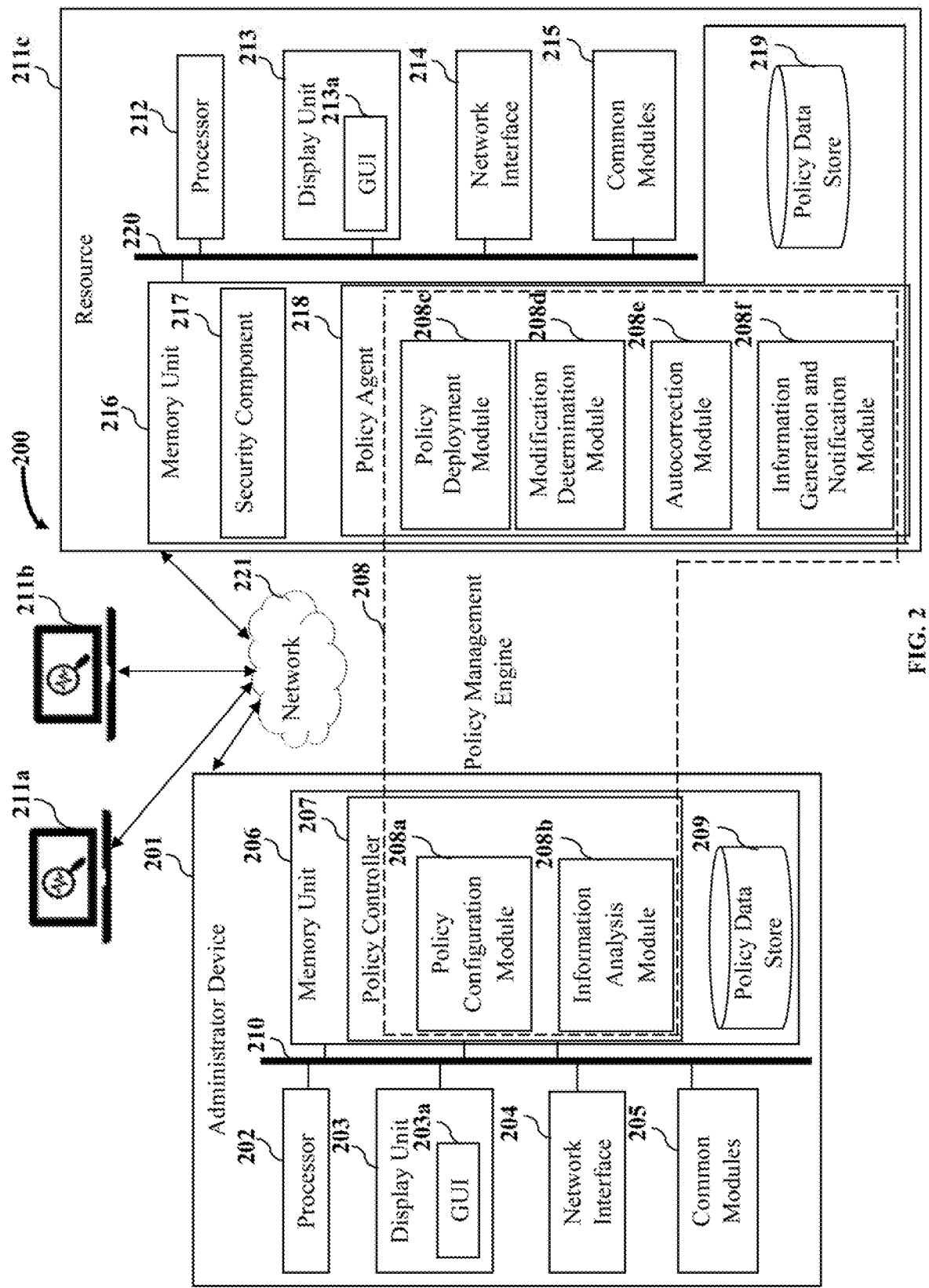
FIG. 2 exemplarily illustrates a system for automatically managing security policies at multiple resources.

FIG. 2 exemplarily illustrates a system 200 for automatically managing security policies at multiple resources, for example, 211a, 211b, and 211c. In an embodiment, the system 200 disclosed herein is implemented in a cloud computing environment. As used herein, "cloud computing environment" refers to a processing environment comprising configurable computing physical and logical resources, for example, networks, servers, storage media, virtual machines, applications, services, etc., and data distributed over a network 221. The cloud computing environment provides an on-demand network access to a shared pool of the configurable computing, physical and logical resources. In another embodiment, the system 200 disclosed herein is a cloud computing-based platform implemented as a service for automatically managing security policies at multiple resources 211a, 211b, and 211c. In another embodiment, the system 200 disclosed herein is implemented as an on-premise platform comprising on-premise software installed and run on computers on the premises of an organization such as an enterprise. In an exemplary implementation as shown in FIG. 2, the system 200 disclosed herein comprises a policy controller 207 deployed at an administrator device 201 and a policy agent 218 deployed at each of multiple resources 211a, 211b, and 211c, for example, endpoint devices, of an organization.

The administrator device 201 and the resources 211a, 211b, and 211c are computer systems that are programmable using high-level computer programming languages. In an embodiment, the administrator device 201 and the resources 211a, 211b, and 211c are implemented using programmed and purposeful hardware. The administrator device 201 is an electronic device, for example, one or more of a server, a workstation, a personal computer, a tablet computing device, a mobile computer, a smart phone, a portable computing device, a network-enabled computing device, an interactive network-enabled communication device, any other suitable computing equipment, combinations of multiple pieces of computing equipment, etc., operated by a system administrator. In an embodiment, the administrator device 201 is in operable communication with the resources 211a, 211b, and, 211c via a network 221, for example, a short-range network or a long-range network. The network 221 is, for example, one of the Internet, an intranet, a wired network a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The system 200 disclosed herein further comprises non-transitory, computer-readable storage media, for example, memory units 206 and 216, for storing computer program instructions defined by the policy controller 207 on the administrator device 201 and the policy agent 218 on each of the resources 211a, 211b, and 211c respectively. As used herein, "non-transitory computer-readable storage media" refers to all computer-readable media, for example, non-volatile media, volatile media, and transmission media, except for a transitory, propagating signal. Non-volatile media comprise, for example, solid state drives, optical discs or magnetic disks, and other persistent memory volatile media including a dynamic random-access memory (DRAM), which typically constitute a main memory. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor. The system 200 disclosed herein further comprises processors 202 and 212 operably and communicatively coupled to the corresponding memory units 206 and 216 respectively, for executing the computer program instructions defined by the policy controller 207 on the administrator device 201 and the policy agent 218 of each of the resources 211a, 211b, and 211c respectively.

The memory units 206 and 216 of the administrator device 201 and the resources 2111a, 211b, and 211c respectively, are used for storing program instructions, applications, and data. The memory units 206 and 216 are, for example, random-access memories (RAMs) or other types of dynamic storage devices that store information and instructions for execution by the respective processors 202 and 212. The memory units 206 and 216 also store temporary variables and other intermediate information used during execution of the instructions by the respective processors 202 and 212. The administrator device 201 and the resources 211a, 211b, and 211c further comprise read only memories (ROMs) or other types of static storage devices that store static information and instructions for the respective processors 202 and 212. In an embodiment, the policy controller 207 is stored in the memory unit 206 of the administrator device 201. Similarly, the policy agent 218 is stored in the memory unit 216 of each of the resources 211a, 211b, and 211c.

The system 200 disclosed herein further comprises storage devices, for example, policy data stores 209 and 219 or databases stored in the memory unit 206 of the administrator device 201 and the memory unit 216 of each of the resources 211a, 211b, and 211c respectively. The policy data stores 209 and 219 of the administrator device 201 and the resources 211a, 211b, and 211c refer to any storage area or medium that can be used for storing data and files. The policy data stores 209 and 219 can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the policy data stores 209 and 219 can also be locations on file systems of the administrator device 201 and the resources 211a, 211b, and 211c. In another embodiment, the policy data stores 209 and 219 can be remotely accessed by the administrator device 201 and the resources 211a, 211b, and 211c via the network 221. In another embodiment, the policy data store 209 is, for example, a database server, that stores the security policies and is remotely accessible by the administrator device 201. In another embodiment, the policy data stores 209 and 219 are configured as cloud-based databases implemented in a cloud computing environment, where computing resources are delivered as a service over the network 221.

The processor 202 of the administrator device 201 is configured to execute the computer program instructions defined by the policy controller 207 for automatically managing security policies at multiple resources 211a, 211b, and 211c. The processor 212 of each of the resources 211a, 211b, and 211c is configured to execute the computer program instructions defined by the policy agent 218 for automatically managing security policies at multiple resources 211a, 211b, and 211c. The processors 202 and 212 refer to any one or more microprocessors, central processing unit (CPU) devices, finite state machines, computers, microcontrollers, digital signal processors, logic, logic devices, user circuits, application specific integrated circuits (ASICs), field-programmable gate arrays (FPGAs), chips, etc., or any combination thereof, capable of executing computer programs or a series of commands, instructions, or state transitions. In an embodiment, the processors 202 and 212 are implemented as processor sets comprising, for example, a programmed microprocessor and a math or, graphics co-processor. The administrator device 201 and the resources 211a, 211b, and 211c are not limited to employing their respective processors 202 and 212. In an embodiment, the administrator device 201 and the resources 211a, 211b, and 211c employ controllers or microcontrollers. The processor 202 of the administrator device 201 executes the modules, for example, 208a and 208b, of the policy controller 207. The processor 212 of each of the resources 211a, 211b, and 211c executes the modules, for example, 208c, 208d, 208e, and 208f, of each of the resources 211a, 211b, and 211c.

As exemplarily illustrated in FIG. 2, the administrator device 201 further comprises a data bus 210, a display unit 203, a network interface 204, and common modules 205. Similarly, as exemplarily illustrated in FIG. 2, each of the resources 211a, 211b, and 211c further comprises a data bus 220, a display unit 213, a network interface 214, and common modules 215. The data bus 210 of the administrator device 201 pert its communications between the modules, for example, 202, 203, 204, 205, 206, etc., of the administrator device 201. The data bus 220 of each of the resources 211a, 211b, and 211c permits communications between the modules, for example, 212, 213, 214, 215, 216, etc., of each of the resources 211a, 211b, and 211c. The display unit 203 of the administrator device 201, via a graphical user interface (GUI) 203a, displays information, display interfaces, user interface elements such as checkboxes input text fields, etc., for example, for allowing a system administrator to configure security policies for the resources 211a, 211b, and 211c, review notifications comprising the detailed information of the modifications and the autocorrection of the security policies rendered by the resources 211a, 211b, and 211c, analyze and manage the security policies, etc. The administrator device 201 renders the GUI 203a on the display unit 203 for receiving the system administrator's configuration inputs and parameters, etc., for automatically managing security policies of the resources 211a, 211b, and 211c. In an embodiment, the display unit 203 is externally coupled to the administrator device 201. The display unit 213 of each of the resources 211a, 211b, and 211c, via a GUI 213a, displays information, display interfaces, user interface elements such as checkboxes, input text fields, etc., for example, for allowing a user such as an administrator of each of the resources 211a, 211b, and 211c to configure and deploy the security policies at the resources 211a, 211b, and 211c. Each of the resources 211a, 211b, and 211c renders the GUI 213a on the display unit 213 for displaying information related to the security policy. In an embodiment, the display unit 213 is externally coupled to each of the resources 211a, 211b, and 211c. The GUIs 203a and 213a of the administrator device 201 and each of the resources 211a, 211b, and 211c respectively, comprise, for example, online web interfaces, web-based downloadable application interfaces, mobile-based downloadable application interfaces, etc. The display units 203 and 213 of the administrator device 201 and each of the resources 211a, 211b, and 211c respectively, display the GUIs 203a anti 213a respectively.

The network interfaces 204 and 214 of the administrator device 201 and each of the resources 211a, 211b, and 211c respectively, enable connection of the administrator device 201 and each of the resources 211a, 211b, and 211c respectively, to the network 221. In an embodiment, the network interfaces 204 and 214 are provided as interface cards also referred to as line cards. The network interfaces 204 and 214 are, for example, one or more of infrared interfaces, interfaces implementing of Wi-Fi® Alliance Corporation, universal serial bus interfaces, FireWire interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/interact protocol (IP), interfaces based on wireless communications technology such as satellite technology, radio frequency technology, near field communication, etc. The common modules 205 and 215 of the administrator device 201 and each of the resources 211a, 211b, and 211c respectively comprise, for example, input/output (I/O) controllers, input devices such as alphanumeric keyboards, microphones, touchpads, pointing devices, etc., output devices, fixed media drives such as hard drives, removable media drives for receiving removable media, etc. Computer applications and programs are used for operating the administrator device 201 and the resources 211a, 211b, and 211c. The programs are loaded onto fixed media drives and into the memory units 206 and 216 of the administrator device 201 and each of the resources 211a, 211b, and 211c respectively, via their respective removable media drives. In an embodiment, the computer applications and the programs are loaded into the memory units 206 and 216 of the administrator device 201 and each of the resources 211a, 211b, and 211c respectively, directly via the network 221.

In an embodiment, the policy controller 207 is configured as a central module on which a user, for example, a system administrator, configures security policies that allow access between different grouped sets of resources. The policy controller 207 computes security policies specific to each resource, for example, 211a, 211b, and 211c, stores the security policies in the policy data store 209, and pushes the security policies to the resources 211a, 211b, and 211c for application of the security policies at the respective resources 211a, 211b, and 211c. Each individual resource, for example, 211a, 211b, or 211c, comprises its own policy agent 218 in a one-to-one correspondence, where one policy agent 218 corresponds to one resource. In an embodiment, the policy agent 218 deployed at each of the resources 211a, 211b, and 211c is configured as a thin client application that runs on each of the corresponding resources 211a, 211b, and 211c. The policy agent 218 is configured to establish remote connections in a server-based computing environment. In the system 200 disclosed herein, the policy agent 218 communicates with the policy controller 207 to download rules of the security policy for the respective resource 211a, 211b, or 211c. The policy agent 218 stores the downloaded rules of the security policy in the policy data store 219. The policy agent 218 at each of the resources 211a, 211b, and 211c converts the rules of the security policy received from the policy controller 207, for example, into operating system (OS) specific commands and/or application programming interface (API) messages, and applies the converted rules of the security policy on a respective resource 211a, 211b, or 211c. The policy agent 218 also detects when the security policy is tampered with, autocorrects modifications made to the security policy, and sends the tampered security policy to the policy controller 207 for further analysis.

The system 200 disclosed herein further comprises the policy management engine 208 for automatically managing security policies at multiple resources, for example, 211a, 211b, and 211c by detecting, identifying, automatically correcting, and notifying modifications made to the security policies at the resources 211a, 211b and 211c. The memory units 206 and 216 are configured to store computer program instructions defined by the policy management engine 208. The processors 202 and 212 are configured to execute the computer program instructions defined by the policy management engine 208. In an exemplary implementation of the system 200 disclosed herein, the policy management engine 208 comprises multiple modules implemented at the policy controller 207 and the policy agent 218. The modules of the policy management engine 208 comprise, for example, a policy configuration module 208a, an information analysis module 208b, a policy deployment module 208c, a modification determination module 208d, an autocorrection module 208e, and an information generation and notification module 208f. In an exemplary implementation as shown in FIG. 2, the policy configuration module 208a and the information analysis module 208b of the policy management engine 208 are implemented at the policy controller 207, while the policy deployment module 208c, the modification determination module 208d, the autocorrection module 208e, and the information generation and notification module 208f of the policy management engine 208 are implemented at the policy agent 218 of each of the resources 211a, 211b, and 211c. In an embodiment, the policy controller 207 is implemented as a processor configured to execute computer program instructions defined by modules, for example, 208a and 208b, of the policy management engine 208. In various embodiments, different configurations, arrangements, and positions of the modules 208a, 208b, 208c, 208d, 208e, 208f, etc., of the policy management engine 208 are configured at and/or between the policy controller 207 and each policy agent 218 for automatically managing security policies in accordance with the method disclosed in the detailed description of FIG. 1. In the system 200 disclosed herein, the policy management engine 208 interfaces with the policy controller 207, and a security component 217 and the policy agent 218 on each of the resources 211a, 211b, and 211c, and therefore more than one specifically programmed computer system is used for automatically managing security policies at multiple resources 211a, 211b, and 211c by detecting, identifying, automatically correcting, and notifying modifications made to the security policies at the resources 211a, 211b, and 211c.

The policy configuration module 208a at the policy controller 207 configures a security policy for each of the resources 211a, 211b, and 211c, for example, to allow access from one set of resources to another set of resources on certain ports and protocols based on configuration parameters, for example, type of each rule of the security policy, a source IP address, a destination IP address, a destination port, a traffic protocol, etc., and inputs received from a system administrator using the GUI 203a on the administrator device 201. The policy deployment module 208c at the policy agent 218 of each of the resources 211a, 211b, and 211c receives and deploys the security policy configured for each of the resources 211a, 211b, and 211c with one or more of the configuration parameters on the security component 217, for example, a host-based firewall, of each of the resources 211a, 211b, and 211c. The security component 217 is implemented as a hardware component, or a software component, or a combination of a hardware component and a software component on each of the resources 211a, 211b, and 211c. In an embodiment, the policy deployment module 208c transforms the security policy into a format, for example, OS specific commands and/or API messages, applicable to each of the resources 211a, 211b, and 211c and configures the transformed security policy on the security component 217 of each of the resources 211a, 211b, and 211c for the deployment of the security policy on the security component 217 of each of the resources 211a, 211b, and 211c. In an embodiment, the policy deployment module 208c creates and stores a policy digest comprising the security policy and the configuration parameters in the policy data store 219 at each of the resources 211a, 211b, and 211c.

The modification determination module 208d monitors the security component 217 and determines modifications made to the security policy at a corresponding resource, for example, 211c. On determining the modifications made to the security policy, the autocorrection module 208e, in communication with the modification determination module 208d and the policy data store 219, automatically corrects the security policy at the corresponding resource 211c. The modification determination module 208d recomputes the security policy at the security component 217 of the corresponding resource 211c and compares the recomputed security policy with the deployed security policy for the determination of the modifications made to the security policy at the corresponding resource 211c. The information generation and notification module 208f generates and renders a notification comprising the security policy, the modifications, and detailed information of the modifications and the automatic correction of the security policy as disclosed in the detailed description of FIG. 1, to the administrator device 201 for analysis and management of the security policy. The information analysis module 208b at the policy controller 207 receives the security policy, the modifications, and the detailed information of the modifications and the automatic correction of the security policy from the policy agent 218 at the corresponding resource 211c and determines an extent and patterns of changes incurred due to the modifications made to the security policy at the corresponding resource 211c using one or more items of the detailed information.

In an embodiment, on determining the modifications made to the security policy, the information generation and notification module 208f at the policy agent 218 generates and renders a notification comprising the security policy, the modifications, a timestamp of each of the modifications, and information of the automatic correction of the security policy to the administrator device 201 for analysis and management of the security policy. In this embodiment, the information analysis module 208b at the policy controller 207 performs a detailed analysis of the received security policy, the modifications, and the autocorrections from the notification and generates the detailed information of the modifications comprising, for example, an identification of the corresponding resource 211c, a description of the modifications made to the security policy at the corresponding resource 211c, a type of each of the modifications, locations of the modifications, a number of instances of each of the modifications, volume and type of traffic flow incurred due to the modifications, historical modification information associated with each of the resources 211a, 211b, and 211c, corrections required in the security policy, historical correction information associated with each of the resources 211a, 211b, and 211c, event information that triggered the modifications, etc., by comparing the received security policy with the originally configured security policy stored in the policy data store 209. The information analysis module 208b then generates an additional notification comprising the detailed information generated at the policy controller 207 and renders the additional notification on the administrator device 201 via the GUI 203a. In various embodiments, the system 200 disclosed herein allows the generation of the detailed information of the modifications and the automatic correction of the security policy, and the detailed analysis of the security policy, the modifications, and the automatic corrections to be performed partially by the policy controller 207 at the administrator device 201 and partially by the policy agent 218 at each of the resources 211a, 211b, and 211c.

The policy configuration module 208a and the information analysis module 208b of the policy management engine 208 implemented at the policy controller 207 are disclosed above as software implemented on the processor 202 of the administrator device 201. Similarly, the policy deployment module 208c, the modification determination module 208d, the autocorrection module 208e, and the information generation and notification module 208f of the policy management engine 208 implemented at the policy agent 218 are disclosed above as software implemented on the processor 212 of each of the resources 211a, 211b, and 211c. In an embodiment, the modules, for example, 208a and 208b of the policy controller 207, and the modules, for example, 208c, 208d, 208e, and 208f, of the policy agent 218 are implemented completely in hardware. In another embodiment, the modules, for example, 208a and 208b, of the policy controller 207, and the modules, for example, 208e, 208d, 208e, and 208f, of the policy agent 218 are implemented by logic circuits to carry out their respective functions disclosed above. In another embodiment, the system 200 disclosed herein is also implemented as a combination of hardware and software including the policy controller 207, the policy agent 218, and processors, for example, 202 and 212, that are used to implement the modules, for example, 208a and 208b of the policy controller 207 at the administrator device 201, and the modules, for example, 208c, 208d, 208e, and 208f of the policy agent 218 at each of the resources 211a, 211b, and 211c.

The processor 202 of the administrator device 201 retrieves instructions defined by the policy configuration module 208a and the information analysis module 208b of the policy management engine 208 at the policy controller 207 for performing respective functions disclosed above. The processor 212 of each of the resources 211a, 211b, and 211c retrieves instructions defined by the policy deployment module 208c, the modification determination module 208d, the autocorrection module 208e, and the information generation and notification module 208f of the policy management engine 208 at the policy agent 218 at each of the resources 211a, 211b, and 211c for performing respective functions disclosed above. The processor 202 of the administrator device 201 retrieves instructions for executing the modules, for example, 208a and 208b of the policy controller 207 from the memory unit 206 of the administrator device 201. The processor 212 of each of the resources 211a, 211b, and 211c retrieves instructions for executing the modules, for example, 208c, 208d, 208e, and 208f, of the policy agent 218 from the memory unit 216 of each of the resources 211a, 211b, and 211c. A program counter determines the location of the instructions in the respective memory units 206 and 216. The program counter stares a number that identifies the current position in the program of each of the modules, for example, 208a and 208b, of the policy controller 207, and the modules, for example, 208c, 208d, 208e, and 208f, of the policy agent 218. The instructions fetched by the processors 202 and 212 of the administrator device 201 and each of the resources 211a, 211b, and 211c respectively, from the respective memory units 206 and 216 after being processed are decoded. The instructions are stored in an instruction register in the respective processors 202 and 212. After processing and decoding, the processors 202 and 212 execute their respective instructions, thereby performing one or more processes defined by those instructions.

At the time of execution, the instructions stored in the instruction register are examined to determine the operations to be performed. The processors 202 and 212 then perform be specified operations. The operations comprise arithmetic operations and logic operations. Operating systems perform multiple routines for performing a number of tasks required to assign the input devices, the output devices, and the respective memory units 206 and 216 for execution of the modules, for example, 208a and 208b, of the policy controller 207, and the modules, for example, 208c, 208d, 208e, and 208f, of the policy agent 218 respectively. The tasks performed by the operating systems comprise, for example, assigning memory to the modules, for example, 208a and 208b, of the policy controller 207 and the modules, for example, 208c, 208d, 208e, and 208f, of the policy agent 218 and to data used by the administrator device 201 and the resources 211a, 211b, and 211c, moving data between the respective memory units 206 and 216 and disk units, and handling input/output operations. The operating systems perform the tasks on request by the operations and after performing the tasks, the operating systems transfer the execution control back to the respective processors 202 and 212. The processors 202 and 212 continue the execution to obtain one or more outputs.

For purposes of illustration, the detailed description refers to the modules, for example, 208a and 208b, of the policy controller 207, and the modules, for example, 208c, 208d, 208e, and 208f, of the policy agent 218 being run locally on single computer systems; however the scope of the method and the system 200 disclosed herein is not limited to the modules, for example, 208a and 208b, of the policy controller 207, and the modules, for example, 208e, 208d, 208e, and 208f, of the policy agent 218 being run locally on single computer systems via the operating systems and the respective processors 202 and 212, but may be extended to run remotely over the network 221 by employing a web browser and a remote, server, a mobile phone, or other electronic devices. In an embodiment, one or more portions of the system 200 are distributed across one or more computer systems (not shown) coupled to the network 221.

The non-transitory computer-readable storage media disclosed herein store computer program instructions executable by the processors 202 and 212 for automatically managing security policies at multiple resources 211a, 211b, and 211c by detecting, identifying, automatically correcting, and notifying modifications made to the security policies at the resources 211a, 211b, and 211c. The computer program instructions implement the processes of various embodiments disclosed above and perform additional steps that may be required and contemplated fir automatically managing security policies at multiple resources 211b, and 211c by detecting, identifying, automatically correcting, and notifying modifications made to the security policies at the resources 211a, 211b, and 211c. When the computer program instructions are executed by the processors 202 and 212, the computer program instructions cause the processors 202 and 212 to perform the steps of the method for automatically managing security policies at multiple resources 211a, 211b, and 211c by detecting, identifying, automatically correcting, and notifying modifications made to the security policies at the resources 211a, 211b, and 211c as disclosed in the detailed description of FIGS. 1-2. In an embodiment, a single piece of computer program code comprising computer program instructions performs one or more steps of the method disclosed in the detailed description of FIG. 1. The processors 202 and 212 of the administrator device 201 and each of the resources 211a, 211b, and 211c respectively, retrieve these computer program instructions and execute them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be stored on a non-transitory, computer-readable storage medium. Furthermore, in another embodiment, use of a module, or an engine, or a unit refers to the non-transitory, computer-readable storage medium including the computer program codes, that is specifically adapted to be executed by the microcontroller to perform predetermined operations. In another embodiment, the term "module" or "engine" or "unit" refers to the combination of the microcontroller and the non-transitory, computer-readable storage medium. Often module or engine boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 3:
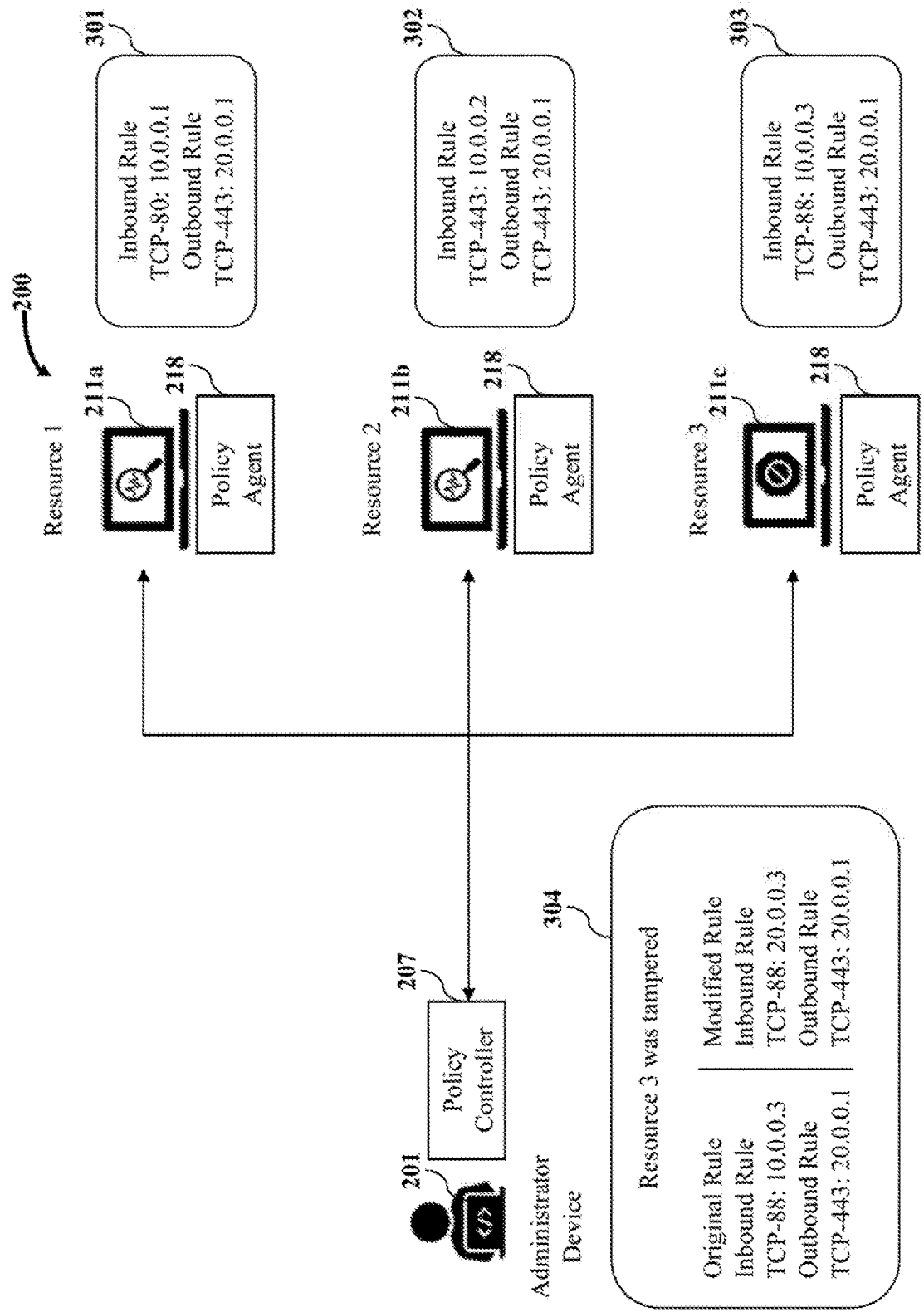
FIG. 3 exemplarily illustrates a schematic diagram showing automatic management of security policies at multiple resources.

FIG. 3 exemplarily illustrates a schematic diagram showing automatic management of security policies at multiple resources, for example, 211a, 211b, and 211c. Consider an example where the policy management engine 208 of the system 200 shown in FIG. 2, is implemented at the policy controller 207 on an administrator device 201 and at the policy agents 218 deployed on three resources 211a, 211b, and 211c shown in FIG. 3. A user, for example, a system administrator who operates the administrator device 201 enters configuration parameters on the graphical user interface (GUI) 203a displayed on the administrator device 201 shown in FIG. 2, for configuring security policies for the three resources 211a, 211b, and 211c to allow access from one set of resources to another set of resources on certain ports and protocols. For example, the system administrator configures a security policy comprising rules that allow a set of systems having interact protocol (IP) addresses in a subnet range of 10.102.20.0/24 in Group-1 to access a set of servers tagged as "WEB" in Group-2 over a port "443" and a protocol "TCP". This security policy allows traffic to flow from resources belonging to Group-1 to resources belonging to Group-2 over port 443 and a transmission control protocol (TCP). The system administrator may configure many such rules in the security policy for each resource.

The policy controller 207 receives the configurations of the security policies with the configuration parameters entered by the system administrator via the GUI 203a and converts the security policies into resource specific security policies, that is, security policies corresponding to the resources 211a, 211b, and 211c. In this example, the policy controller 207 converts the security policies specified by the system administrator into resource specific policies as follows. The policy controller 207 identifies the resources matching the parameter defined in Group-1, that is, subnet range of 10.102.20.0/24, by querying the policy data store 209 shown in FIG. 2, that stores resource information. The policy controller 207 identifies the resources matching the parameter defined in Group-2, that is, resources tagged as "WEB", by querying the policy data store 209 that stores the resource information. The policy controller 207 then computes the security policy for allowing each resource in Group-1 to send outbound traffic to the resources in Group-2. Similarly, the policy controller 207 computes the security policy for each resource in Group-2 to receive inbound traffic from the resources in Group-1. In an example where host-based firewalls are deployed as security components 217 shown in FIG. 2, on the resources 211a, 211b, and 211c, the policy controller 207 computes host-based firewall policies based on IP addresses, and hence utilizes IP address information from each of the resources 211a, 211b, and 211c for the computation.

The policy controller 207 computes the resource specific policies with the configuration parameters comprising, for example, a type of rule such as add or delete, source IP, destination IP, destination port, and traffic protocol for each of the resources 211a, 211b, and 211c. The type of rule indicates whether a rule must be added or deleted in a resource specific policy. The source IP indicates a list of source IP addresses from where traffic is allowed when the traffic is inbound. The destination IP indicates a list of destination IP addresses to where traffic is allowed when the traffic is outbound. The destination port indicates a port on which inbound traffic and outbound traffic are allowed, for example, 443, 80, 53, etc. The traffic protocol indicates a protocol through which inbound traffic and outbound traffic are allowed. The policy controller 207 sends the computed resource specific policies with the configuration parameters to the policy agent 218 on each of the resources 211a, 211b, and 211c. In an embodiment, the policy agent 218 on each of the resources 211a, 211b, and 211c communicates with the policy controller 207 at periodic time intervals and requests for the security policy specific to the respective resource 211a, 211b, and 211c. In this embodiment, the policy controller 207 sends the security policy configured for each of the resources 211a, 211b, and 211c to the policy agent 218 on the respective resources 211a, 211b, and 211c, when the policy agent 218 requests for the security policy.

The policy agent 218 running on each, of the resources 211a, 211b, and 211c receives the respective security policy specific to the respective resource 211a, 211b, and 211c from the policy controller 207. In this example, the policy agents 218 on the resources 211a, 211b, and 211c convert the security policies received from the policy controller 207 into a format that can be used to configure host-based firewalls. A host-based firewall typically expects "port", "protocol", "direction of traffic", "source-ip" and "destination-ip" to configure a rule in a host-based firewall policy to be deployed on the host-based firewall. After converting the security policies to a host-based firewall acceptable format, the policy agent 218 of each resource 211a, 211b, and 211c creates a digest of all the rules applicable for the corresponding resource 211a, 211b, or 211c and stores the digest in the policy data store 219 shown in FIG. 2. The policy agent 218 then applies the rules of the host-based firewall policy on the host-based firewall by calling either an appropriate operating system (OS) specific application programming interface (API) or a command depending on the operating system on which the host-based firewall policy is being applied.

The policy agent 218 monitors the host-based firewall periodically, for example, every 15 seconds, to determine modifications made to the rules of the host-based firewall policy. In an embodiment, the policy agent 218 determines the modifications by calculating a digest of all the rules in the host-based firewall policy and comparing the digest with the previously stored digest in the policy data store 219. In another embodiment, the policy agent 218 determines the modifications by comparing a hash of the original host-based firewall policy previously stored in the policy data store 219 and a hash of the modified host-based firewall policy. In this embodiment, the policy agent 218 generates a hash of the original host-based firewall policy and a hash of the modified host-based firewall policy by executing a hash function. The hash function maps data of the host-based firewall policies of an arbitrary size onto data of a fixed size. If there is a mismatch, then the policy agent 218 detects an unauthorized modification made to one or more rules of the host-based firewall policy. In another embodiment, the operating system of each resource 211a, 211b, and 211c is configured to notify modifications made to the rules of the host-based firewall policy. Once the policy agent 218 detects that the rules of the host-based firewall policy have been modified, the policy anent 218 collects all the rules in the host-based firewall policy including the modified rules and sends the modified host-based firewall policy to the policy controller 207 at the administrator device 201, specifying a timestamp at which each of the modifications were detected. The policy agent 218 also reapplies the correct, set of rules of the originally deployed host-based firewall policy on the host-based firewall immediately to automatically restore or correct the host-based firewall policy and sends the timestamp of the autocorrection to the policy controller 207. In an embodiment, for automatically correcting the host-based firewall policy after the modifications are detected, the policy agent 218 uses the correct set of rules of the host-based firewall policy locally stored in the policy data store 219. In another embodiment, the policy agent 218 contacts the policy controller 207 for retrieving the correct set of rules of the host-based firewall policy configured for that particular resource, for example, 211a, 211b, or 211c, to automatically correct the host-based firewall policy after the modifications are detected. In this embodiment, the policy controller 207 retrieves the correct set of rules of the host-based firewall policy configured for that particular resource, for example, 211a, 211b, or 211c, from the policy data store 209 and transmits the correct set of rules to the policy agent 218 deployed on that particular resource, for example, 211a, 211b, or 211c.

The policy controller 207 receives the modified host-based firewall policy from the policy agent 218 and parses the modified host-based firewall policy to identify the modifications that were performed in the rules of the modified host-based firewall policy. The modified host-based firewall policies are typically of a format supported by different operating systems (OSs). The policy controller 207 parses and converts the modified host-based firewall policy into a common format, that is, the format in which the policy controller 207 originally computed the host-based firewall policy. In an embodiment, the policy controller 207 parses and converts the modified host-based firewall policy into a common format based on the operating system of the resource from where the modified host-based firewall policy is received. In an embodiment, the policy controller 207 compares the modified host-based firewall policy and the original host-based firewall policy to determine the type of modifications made to the host-based firewall policy. The modifications comprise, for example, addition of a new port and protocol that were not configured by the system administrator to allow malicious traffic to a set of IP addresses; addition of a new set of IP addresses to an existing port and protocol that were allowed by the system administrator, to allow traffic to unauthorized or external IP addresses; removal of a set of IP addresses from an existing port and protocol that were allowed by the system administrator, to cause denial of service; removal of a port and a protocol that were configured by the system administrator, to cause denial of service, etc. The policy controller 207 identifies the rules of the modified host-based firewall policy that were added, deleted, and modified.

The policy controller 207 identifies the exact type of modifications made to the host-based firewall policy and generates a notification comprising detailed information on, for example, the resource on which modification has occurred, the time of the modification, the exact type of modification as disclosed above, the time of the automatic correction, traffic flow between the time of the modification and the time of the automatic correction to indicate the nature of compromise, that is, between the time of the modification and the time of the automatic correction, indicating the type of data leak or denial of service that has occurred, history of such modifications and corrections for a particular resource etc. The policy controller 207 renders the notification on the administrator device 201 via the GUI 203a to allow the system administrator to review, analyze, and manage the host-based firewall policy. The history of the modifications and the corrections in the notification allows the system administrator to identify a pattern of changes to determine the change being performed by a malicious software or a manual hacker within an organization. Through the notification, the policy controller 207 notifies the system administrator about tampering of the host-based firewall policy with detailed information of the tampering, the resource where the host-based firewall policy was tampered, and a time of occurrence of the tampering.

Consider another example where the policy management engine 208 of the system 200 shown in FIG. 2, is implemented at the policy controller 207 on the administrator device 201 and at the policy agents 218 deployed on three resources 211a, 211b, and 211c as shown in FIG. 3. A user, for example, a system administrator who operates the administrator device 201 enters configuration parameters on the GUI 203a displayed on the administrator device 201 for configuring security policies for the three resources 211a, 211b, and 211c. For example, the system administrator configures a security policy 1 301 comprising an inbound rule "TCP-80: 10.0.0.1" and an outbound rule "TCP-443: 20.0.0.1" for resource 1 211a; a security policy 2 302 comprising an inbound rule "TCP-443: 10.0.0.2" and an outbound rule "TCP-443: 20.0.0.1" for resource 2 211b; and a security policy 3 303 comprising an inbound rule "TCP-88: 10.0.0.3" and an outbound rule "TCP-443: 20.0.0.1" for resource 3 211c.

The policy controller 207 receives the configurations of the security policies 301, 302, and 303 with the configuration parameters entered by the system administrator via the GUI 203a and converts the security policies 301, 302, and 303 into resource specific security policies 301, 302, and 303, that is, security policies 301, 302, and 303 corresponding to the resources 211a, 211b, and 211c respectively. The policy controller 207 sends the computed resource specific policies 301, 302, and 303 with the configuration parameters to the policy agents 218 on the resources 211a, 211b, and 211c respectively. The policy agents 218 running on the resources 211a, 211b, and 211c receive the security policies 301, 302, and 303 specific to the resources 211a, 211b, and 211c respectively. In this example, the policy agents 218 on the resources 211a, 211b, and 211c convert the security policies 301, 302, and 303 received from the policy controller 207 respectively, into a format that can be used to configure the security components 217 deployed on the resources 211a, 211b, and 211c respectively. After converting the security policies 301, 302, and 303 into a security component acceptable format, the policy agents 218 of the resources 211a, 211b, and 211c respectively, create digests of the rules applicable for the respective resources 211a, 211b, and 211c and store the digests in the respective policy data stores 219 shown in FIG. 2.

The policy agents 218 then apply the rules of the security policies 301, 302, and 303 on the respective security components of the resources 211a, 211b, and 211c respectively, by calling either an appropriate OS specific API or a command depending on the operating system on which each of the security policies 301, 302, and 303 are being applied. For example, the policy agent 218 at resource 1 211a applies the security policy 1 301 comprising the inbound rule "TCP-80: 10.0.0.1" and the outbound rule "TCP-443: 20.0.0.1" on the security component deployed on resource 1 211a by calling either an appropriate OS specific API or a command depending on the operating system of resource 1 211a. Similarly, the policy agent 218 at resource 2 211b applies the security policy 2 302 comprising the inbound rule "TCP-443: 10.0.0.2" and the outbound rule "TCP-443: 20.0.0.1" on the security component deployed on resource 2 211b by calling either an appropriate OS specific API or a command depending on the operating system of resource 2 211b. Similarly, the policy agent 218 at resource 3 211c applies the security policy 3 303 comprising the inbound rule "TCP-88: 10.0.0.3" and an outbound rule "TCP-443: 20.0.0.1" on the security component deployed on resource 3 211c by calling either an appropriate OS specific API or a command depending on the operating system of resource 3 211c.

The policy agents 218 on the resources 211a, 211b, and 211c monitor their respective security components periodically, for example, every 15 seconds, to determine modifications made to the rules of the security policies 301, 302, and 303 respectively. Consider an example where an employee who operates resource 3 211c modifies the inbound rule "TCP-88: 10.0.0.3" of the security policy 3 303 deployed on the security component of resource 3 211c to "TCP-88: 20.0.0.3" to allow traffic from the IP address "20.0.0.3" into resource 3 211c. The policy agent 218 deployed at resource 3 211c determines the modification made to the security policy 3 303 by calculating a digest of the rules in the security policy 3 303 and comparing the digest with the previously stored digest in the policy data store 219. Since there is a mismatch of the inbound rule in the security policy 3 303, the policy agent 218 detects an unauthorized modification made to the inbound rule of the security policy 3 303. On detecting the unauthorized modification, the policy agent 218 collects the rules in the security policy 3 303 including the modified inbound rule and sends the modified security policy to the policy controller 207 at the administrator device 201, specifying a timestamp at which the unauthorized modification to the inbound rule of the security policy 3 303 was detected. The policy agent 218 also reapplies the correct set of rules of the originally deployed security policy 3 303 on the security component of resource 3 211c to automatically correct the inbound rule of the security policy 3 303 back to "TCP-88: 10.0.0.3" and sends the timestamp of the autocorrection to the policy controller 207.

The policy controller 207 at the administrator device 201 receives the modified security policy from the policy agent 218 and parses the modified security policy to identify the modifications that were performed in the rules of the modified security policy. The policy controller 207 parses and converts the modified security policy into a common format, that is, the format in which the policy controller 207 originally computed the security policy 3 303. The policy controller 207 compares the modified security policy and the or security policy 3 303 to determine the type of modifications made to the security policy 3 303. In this example, the modification comprises addition of a new set of IP addresses to an existing port and protocol that were allowed by the system administrator, to allow traffic to unauthorized or external IP addresses. The policy controller 207 identifies the exact type of modification made to the security policy 3 303 and generates a notification 304 comprising detailed information on, for example, the resource on which the modification occurred, the time of the modification, the type of modification as disclosed above, the time of the automatic correction, traffic flow between the time of the modification and the time of the automatic correction to indicate the nature of compromise, that is, between the time of the modification and the time of the automatic correction, indicating the type of data leak or denial of service that occurred, history of such modifications and corrections for a particular resource, etc.

The policy controller 207 renders the notification 304 on the administrator device 201 via the GUI 203a as exemplarily illustrated in FIG. 3, to allow the system administrator review, analyze, and manage the security policy 3 303 configured for resource 3 211c. In an embodiment, the policy agent 218 at resource 3 211c compares the modified security policy and the original security policy 3 303 to determine the type of modifications made to the security policy 3 303. The policy agent 218 identifies the exact type of modifications made to the security policy 3 303 and generates a notification 304 comprising detailed information on the modifications. The policy agent 218 renders the generated notification 304 to the policy controller 207. The policy controller 207 displays the notification 304 on the GUI 203a of the administrator device 201 to allow the system administrator to review, analyze, and manage the security policy 3 303 configured for resource 3 211c. The method and the system 200 disclosed herein allows the system administrator to secure any breach in a resource of the organization and determine the modifications made to the security policies by hackers.

The method and the system 200 disclosed herein implement one or more, specific computer programs for automatically managing security policies of multiple resources, for example, 211a, 211b, and 211c. The method and the system 200 disclosed herein improve the functionality of a computer and provide an improvement in network security, microsegmentation and firewall technology related to automatically managing security policies of multiple resources as follows: On implementing the method disclosed herein, the policy management engine 208 shown in FIG. 2, receives and deploys a security policy configured for each of the resources with one or more of multiple configuration parameters on a security component 217 shown in FIG. 2, of each of the resources. Moreover, the policy management engine 208 monitors the security component 217 and determines modifications made to the security policy at a corresponding resource. Then, the policy management engine 208, through the use of separate and autonomous computer programs, automatically corrects the security policy at the corresponding resource and generates and renders a notification comprising the security policy, the modifications, and detailed information of the modifications and the automatic correction of the security policy to the administrator device 201 for analysis and management of the security policy. Furthermore, the policy management engine 208 determines an extent and patterns of changes incurred due to the modifications at each of the resources using one or more items of the detailed information.

The focus of the method and the system 200 disclosed herein is on an improvement to network security, microsegmentation and firewall technology and computer functionalities for automatically managing security policies at multiple resources by detecting, identifying, automatically correcting, and notifying modifications made to the security policies at the resources, and not on tasks for which a generic computer is used in its ordinary capacity. Rather, the method and the system 200 disclosed herein are directed to a specific improvement to the way processors in the system 200 operate, embodied in, for example, receiving and deploying a security policy configured for each of the resources with one or more of multiple configuration parameters on a security component 217 of each of the resources; monitoring the security component 217 and determining modifications made to the security policy at a corresponding resource; on determining the modifications made to the security policy, automatically correcting the security policy at the corresponding resource; and generating and rendering a notification comprising the security policy, the modifications, and detailed information of the modifications and the automatic correction of the security policy to the administrator device 201 for analysis and management of the security policy.

In the method disclosed herein, the design and the flow of data and interactions between the policy controller 207 and the policy agents 218 deployed on the corresponding resources are deliberate, designed, and directed. The interactions between the policy controller 207 and the policy agents 218 allow the system 200 to automatically manage security policies at multiple resources by detecting, identifying, automatically correcting, and notifying modifications made to the security policies at the resources. The steps performed by the policy management engine 208 implemented at the policy controller 207 and the policy agents 218 disclosed above require six or more separate computer programs and subprograms, the execution of which cannot be performed by a person using a generic computer with a generic program. The steps performed by the system 200 disclosed above are tangible, provide useful results, and are not abstract. The hardware and software implementation of the system 200 disclosed herein comprising the policy management engine 208 implemented at the policy controller 207 and the policy agents 218, and one or more processors, is an improvement in network security, microsegmentation and firewall technology.

It is apparent in different embodiments that the various methods, algorithms, and computer readable programs disclosed herein are implemented on non-transitory, computer readable storage media appropriately programmed for computing devices. The non-transitory, computer readable storage media participate in providing data, for example, instructions that are read by a computer, a processor or a similar device. In different embodiments, the "non-transitory, computer readable storage media" also refer to a single medium or multiple media, for example, a centralized database, a distributed database, and/or associated caches and servers that store one or more sets of instructions that are read by a computer, a processor or a similar device. The "non-transitory, computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory, computer readable storage media comprise, for example, a floppy disk, a flexible disk, a hard disk, magnetic tape, a laser disc, a Blu-ray Disc® of the Blu-ray Disc Association, any magnetic medium, a compact disc-read-only memory (CD-ROM), a digital versatile disc (DVD), any optical medium, a flash memory card, punch cards, paper tape, any other physical medium with patterns of holes, a random access memory (RAM), a programmable read-only memory (PROM), an erasable programmable read-only memory (EPROM), an electrically erasable programmable read-only memory (EEPROM), a flash memory, any other memory chip or cartridge, or any other medium from which a computer can read.

In an embodiment, the computer programs that implement the methods and algorithms disclosed, herein are stored and transmitted using a variety of media, for example, the computer readable media in various manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PRP), Microsoft®, .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the system 200 disclosed herein are implemented in a non-programmed environment comprising, documents created, for example, in a hypertext markup language (HTML), an extensible markup language (XML), or other format that render aspects of a GUI or perform other functions, when viewed in a visual area or a window of a browser program. In another embodiment, various aspects of the method and the system 200 disclosed herein are implemented as programmed elements, or non-programmed elements, or any suitable combination thereof.

Where databases are described such as the policy data stores 209 and 219 shown in FIG. 2, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 200, the databases are integrated to communicate with each other for enabling simultaneous updates of data linked across the databases, when there are any updates to the data in one of the databases.

The method and the system 200 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the system 200 disclosed herein are not limited to a particular computer system platform, processor, operating system, or network. In an embodiment, one or more embodiments of the method and the system 200 disclosed herein are distributed among one or more computer systems, for example, servers configured to provide one or more services to one or more client computers, or to perform a complete task in a distributed system. For example, one or more embodiments of the method and the system 200 disclosed herein are performed on a client-server system that comprises components distributed among one or more server systems that perform multiple functions according to various embodiments. These components comprise, for example, executable, intermediate, or interpreted code, which communicate over a network using a communication protocol. The method and the system 200 disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the method and the system 200 disclosed herein. While the method and the system 200 have been described with reference to various embodiments, illustrative implementations, drawings, and techniques, it is understood that the words, which have been used herein, are words of description and illustration, rather than words of limitation. Furthermore, although the method and the system 200 have been described herein with reference to particular means, materials, techniques, and embodiments, the method and the system 200 are not intended to be limited to the particulars disclosed herein; rather, the method and the system 200 extend to all functionally equivalent structures, methods and uses, such as are within the scope of the appended claims. While multiple embodiments are disclosed, it will be understood by those skilled in the art, having the benefit of the teachings of this specification, that the method and the system 200 disclosed herein are capable of modifications and other embodiments may be effected and changes may be made thereto, without departing from the scope and spirit of the method and the system 200 disclosed herein.

What is claimed is:

1. A method for automatically managing security policies at a plurality of resources, the method comprising the following steps:

receiving by a policy management engine, a security policy comprising a plurality of configuration parameters, and applicable to each of the resources;

transforming, by the policy management engine, the security policy into a format applicable to the each of the resources, and configuring, by the policy management engine, based on the configuration parameters, transformed security policy on a security component of the each of the resources;

monitoring, by the policy management engine, the security component of the each of the resources and determining, by the policy management engine, modifications made to the security policy at a corresponding one of the resources;

on determining the modifications made to the security policy, automatically correcting, by the policy management engine, the security policy at the corresponding one of the resources; and generating and rendering, by the policy management engine, a notification comprising the security policy, the modifications, and detailed information of the modifications, and automatic correction of the security policy, to at least one administrator device for analysis and management of the security policy.

2. The method as claimed in claim 1, wherein the detailed information of the modifications and the automatic correction of the security policy comprises an identification of the corresponding one of the resources, a description of the modifications made to the security policy at the corresponding one of the resources, a type of each of the modifications, a timestamp of the each of the modifications, locations of the modifications, a number of instances of the each of the modifications, volume and type of traffic flow incurred due to the modifications, historical modification information associated with the each of the resources, corrections required in the security policy, a timestamp of the automatic correction, a status of the automatic correction, historical correction information associated with the each of the resources, and event information that triggered the modifications, and wherein the historical modification information provides an indication of a corresponding one of the resources where the security policy is continuously modified.

3. The method as claimed in claim 1, further comprising a step of determining an extent and patterns of changes incurred due to the modifications made to the security policy at the each of the resources by the policy management engine using one or more items of the detailed information.

4. The method as claimed in claim 1, wherein the step of determining, by the policy management engine, the modifications made to the security policy at the corresponding one of the resources, comprises a step of recomputing the security policy at the security component of the corresponding one of the resources and comparing the recomputed security policy with the deployed security policy, by the policy management engine.

5. The method as claimed in claim 1, wherein the plurality of resources comprises grouped sets of resources.

6. The method as claimed in claim 1, wherein the configuration parameters comprise a type of each rule of the security policy, a source internet protocol address, a destination internet protocol address, a destination port, and a traffic protocol.

7. The method as claimed in claim 1, further comprising a step of creating and storing, by the policy management engine, a policy digest comprising the security policy and the configuration parameters in a storage device at the each of the resources.

8. The method as claimed in claim 1, wherein the modifications comprise additions, deletions, and changes made to the security policy.

9. The method as claimed in claim 1, wherein the security policy is a host-based firewall policy implemented at the each of the resources.

10. A system for automatically managing security policies at a plurality of resources, the system comprising:
at least one processor; and
at least one non-transitory computer readable storage medium operatively and communicatively coupled to the at least one processor and configured to store computer program instructions defined by a policy management engine, the computer program instructions which, when executed by the at least one processor, cause the at least one processor to:
receive a security policy comprising a plurality of configuration parameters, and applicable to each of the resources;
transform the security policy into a format applicable to the each of the resources, and configure, based on the configuration parameters, transformed security policy on a security component of the each of the resources;
monitor the security component of the each of the resources and determine modifications made to the security policy at a corresponding one of the resources;
on determining the modifications made to the security policy, automatically correct the security policy at the corresponding one of the resources; and
generate and render a notification comprising the security policy, the modifications, and detailed information of the modifications and automatic correction of the security policy to at least one administrator device for analysis and management of the security policy.

11. The system as claimed in claim 10, wherein the detailed information of the modifications and the automatic correction of the security policy comprises an identification of the corresponding one of the resources, a description of the modifications made to the security policy at the corresponding one of the resources, a type of each of the modifications, a timestamp of the each of the modifications, locations of the modifications, a number of instances of the each of the modifications, volume and type of traffic flow incurred due to the modifications, historical modification information associated with the each of the resources, corrections required in the security policy, a timestamp of the automatic correction, a status of the automatic correction, historical correction information associated with the each of the resources, and event information that triggered the modifications, and wherein the historical modification information provides an indication of a corresponding one of the resources where the security policy is continuously modified.

12. The system as claimed in claim 10, wherein the policy management engine defines additional computer program instructions which, when executed by the at least one processor, cause the at least one processor to determine an extent and patterns of changes incurred due to the modifications made to the security policy at the each of the resources using one or more items of the detailed information.

13. The system as claimed in claim 10, wherein the policy management engine defines additional computer program instructions which, when executed by the at least one processor, cause the at least one processor to recompute the security policy at the security component of the corresponding one of the resources and compare the recomputed security policy with the deployed security policy for the determination of the modifications made to the security policy at the corresponding one of the resources.

14. The system as claimed in claim 10, wherein the plurality of resources comprises grouped sets of resources.

15. The system as claimed in claim 10, wherein the configuration parameters comprise a type of each rule of the security policy, a source internet protocol address, a destination internet protocol address, a destination port, and a traffic protocol.

16. The system as claimed in claim 10, wherein the policy management engine defines additional computer program instructions which, when executed by the at least one processor, cause the at least one processor to create and store a policy digest comprising the security policy and the configuration parameters in a storage device at the each of the resources.

17. A non-transitory, computer readable storage medium having embodied thereon, computer program instructions executable by at least one processor for automatically managing security policies at a plurality of resources, the computer program instructions which, when executed by the at least one processor, cause the at least one processor to:
  receive a security policy comprising a plurality of configuration parameters, and applicable to each of the resources;
  transform the security policy into a format applicable to the each of the resources, and configure, based on the configuration parameters, transformed security policy on a security component of the each of the resources;
  monitor the security component of the each of the resources and determine modifications made to the security policy at a corresponding one of the resources;
  on determining the modifications made to the security policy, automatically correct the security policy at the corresponding one of the resources; and
  generate and render a notification comprising the security policy, the modifications, and detailed information of the modifications and the automatic correction of the security policy to at least one administrator device for analysis and management of the security policy.

18. The non-transitory, computer-readable storage medium as claimed in claim 17, wherein the detailed information of the modifications and the automatic correction of the security policy comprises an identification of the corresponding one of the resources, a description of the modifications made to the security policy at the corresponding one of the resources, a type of each of the modifications, a timestamp of the each of the modifications, locations of the modifications, a number of instances of the each of the modifications, volume and type of traffic flow incurred due to the modifications, historical modification information associated with the each of the resources, corrections required in the security policy, a timestamp of the automatic correction, a status of the automatic correction, historical correction information associated with the each of the resources, and event information that triggered the modifications, and wherein the historical modification information provides an indication of a corresponding one of the resources where the security policy is continuously modified.

* * * * *